(12) United States Patent
Kim

(10) Patent No.: US 10,830,294 B2
(45) Date of Patent: Nov. 10, 2020

(54) CLUTCH TORQUE ESTIMATING METHOD FOR VEHICLE TRANSMISSION

(71) Applicants: Hyundai Motor Company, Seoul (KR); Kia Motors Corporation, Seoul (KR)

(72) Inventor: Jin Sung Kim, Hwaseong-Si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/533,062

(22) Filed: Aug. 6, 2019

(65) Prior Publication Data
US 2020/0309206 A1    Oct. 1, 2020

(30) Foreign Application Priority Data
Mar. 25, 2019   (KR) .................. 10-2019-0033851

(51) Int. Cl.
| F16D 48/08 | (2006.01) |
| F16D 21/00 | (2006.01) |
| B60W 50/00 | (2006.01) |
| B60W 10/02 | (2006.01) |

(52) U.S. Cl.
CPC ............ *F16D 48/08* (2013.01); *F16D 21/00* (2013.01); *B60W 10/02* (2013.01);
(Continued)

(58) Field of Classification Search
CPC ............ F16D 48/08; F16D 2500/3065; F16D 2500/10412; F16D 2500/3115;
(Continued)

(56) References Cited

U.S. PATENT DOCUMENTS

| 5,679,099 A * | 10/1997 | Kato ................ F16D 48/066 |
| | | 477/176 |
| 9,651,140 B2 | 5/2017 | Åsbogård et al. |

(Continued)

FOREIGN PATENT DOCUMENTS

| JP | 4914682 B2 | 4/2012 |
| KR | 10-1401551 B1 | 6/2014 |

(Continued)

OTHER PUBLICATIONS

De Wit et al., "A New Model for Control of Systems with Friction," *IEEE Transactions on Automatic Control*, vol. 40:3 (1995).

*Primary Examiner* — Roger L Pang
(74) *Attorney, Agent, or Firm* — Morgan, Lewis & Bockius LLP

(57) ABSTRACT

A clutch torque estimating method for a transmission of a vehicle may include inputting model engine torque to a powertrain model by a controller; inputting target clutch torque of a first clutch and target clutch torque of a second clutch to the powertrain model by the controller; inputting shifting information related to the vehicle to the powertrain model by the controller; correcting the powertrain model in real time by feeding back an engine angular velocity error, a clutch angular velocity error of the first clutch, a clutch angular velocity error of the second clutch, a wheel angular velocity error to the powertrain model by the controller; and estimating clutch torque of the first clutch and clutch torque of the second clutch by determining the powertrain model by the controller.

10 Claims, 5 Drawing Sheets

(52) U.S. Cl.
CPC ............... *B60W 2050/0008* (2013.01); *B60W 2510/0283* (2013.01); *B60W 2510/0638* (2013.01); *B60W 2510/0657* (2013.01); *B60W 2710/027* (2013.01); *F16D 2500/1045* (2013.01); *F16D 2500/10412* (2013.01); *F16D 2500/3065* (2013.01); *F16D 2500/3067* (2013.01); *F16D 2500/3068* (2013.01); *F16D 2500/30402* (2013.01); *F16D 2500/30406* (2013.01); *F16D 2500/30801* (2013.01); *F16D 2500/3107* (2013.01); *F16D 2500/3115* (2013.01)

(58) Field of Classification Search
CPC .... F16D 2500/3068; F16D 2500/3067; B60W 10/02; B60W 2050/0008; B60W 2510/0283; B60W 2510/0638; B60W 2510/0657; B60W 2510/10; B60W 2710/027

USPC ..................................................... 701/67, 60
See application file for complete search history.

(56) References Cited

U.S. PATENT DOCUMENTS

| 2009/0042689 | A1* | 2/2009 | Soliman | ............... B60W 20/00 477/5 |
| 2012/0065856 | A1* | 3/2012 | Hansen | ................ B60W 20/00 701/67 |
| 2013/0269644 | A1* | 10/2013 | Arai | ........................ F02N 15/00 123/179.3 |

FOREIGN PATENT DOCUMENTS

| KR | 10-2015-0059926 A | 6/2015 |
| KR | 10-2015-0069400 A | 6/2015 |

\* cited by examiner

FIG. 5

$$J_e \dot{\hat{\omega}}_e = T_{e0} + \hat{\delta}_e - \hat{\mu}_{c1} T_{tc1} - \hat{\mu}_{c2} T_{tc2}$$

$$J'_{c1} \dot{\hat{\omega}}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)}$$

$$J'_{c2} \dot{\hat{\omega}}_{c2} = \hat{\mu}_{c2} T_{tc2} + \frac{\gamma_T(\varphi_o)}{\gamma_T(\varphi_e)} \hat{\mu}_{c1} T_{tc1} - \frac{T_{se}(\hat{\omega}_{c2}, \hat{\omega}_w)}{\gamma_T(\varphi_e)}$$

$$J_v \dot{\hat{\omega}}_w = T_{sn}(\hat{\omega}_{ci}, \hat{\omega}_w) - T_L(\hat{\omega}_w)$$

CLUTCH TORQUE ESTIMATING METHOD FOR VEHICLE TRANSMISSION

CROSS REFERENCE TO RELATED APPLICATION

The present application claims priority to Korean Patent Application No. 10-2019-0033851, filed Mar. 25, 2019, the entire contents of which is incorporated herein for all purposes by this reference.

BACKGROUND OF THE INVENTION

Field of the Invention

The present invention relates to a transmission clutch, particularly, to a technology of estimating torque which is transmitted through a dry clutch of a Dual Clutch Transmission (DCT).

Description of Related Art

In a dual-clutch transmission (DCT) using a dry clutch, controller controls the clutch to generate a clutch actuator stroke corresponding to desired clutch torque while managing the relationship between the stroke of the clutch actuator and the clutch torque through a Torque-Stroke (T-S) curve.

However, the characteristics of the dry clutch continuously change due to the temperature of the clutch, a wear state, deformation of portions related to the clutch, etc. while a vehicle is driven, so that the T-S curve continuously changes as time passes, and it is difficult to directly measure clutch torque through a sensor. Accordingly, there is a demand for a technology that can estimate as accurately as possible the value of the current clutch torque.

A technology that estimates clutch torque using an observer of control engineering in the related art has been provided, but a more accurate estimate of clutch torque is necessary to improve launch performance and shifting quality of vehicles.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch torque estimating method for a transmission of a vehicle, the method being able to further improve launch performance and shifting quality of a vehicle by more accurately estimating clutch torque of a dry clutch which is used for a DCT, being able to improve the commercial value of the vehicle.

In view of the above aspect, a clutch torque estimating method for a transmission of a vehicle of the present invention may include: inputting model engine torque to a powertrain model by a controller; inputting target clutch torque of a first clutch and target clutch torque of a second clutch to the powertrain model by the controller; inputting shifting information related to the vehicle to the powertrain model by the controller; correcting the powertrain model in real time by feeding back an engine angular velocity error which is the difference between a measured engine angular velocity and an estimated engine angular velocity determined from the powertrain model, a clutch angular velocity error of the first clutch which is the difference between a measured clutch angular velocity of the first clutch and an estimated clutch angular velocity of the first clutch determined from the powertrain model, a clutch angular velocity error of the second clutch which is the difference between a measured clutch angular velocity of the second clutch and an estimated clutch angular velocity of the second clutch determined from the powertrain model, and a wheel angular velocity error which is the difference between a measured wheel angular velocity and an estimated wheel angular velocity determined from the powertrain model, to the powertrain model by the controller; estimating clutch torque of the first clutch and clutch torque of the second clutch by determining the powertrain model by the controller; and controlling the first clutch and the second clutch using the estimated clutch torque of the first clutch and the estimated clutch torque of the second clutch by the controller.

The powertrain model may include an engine model determined according to engine dynamics; a first clutch model and a second clutch model determined according to clutch dynamics; and a vehicle model determined according to vehicle dynamics.

The model engine torque may be input to the powertrain model together with an estimated engine torque error determined by cumulative-integrating the engine angular speed error.

The target clutch torque of the first clutch may be multiplied by a clutch characteristic variable of the first clutch determined by a clutch friction force characteristic model of the first clutch and is then input to the powertrain model, and the target clutch torque of the second clutch may be multiplied by a clutch characteristic variable of the second clutch determined by a clutch friction force characteristic model of the second clutch and is then input to the powertrain model.

The engine model may be $$J_e \hat{\omega}_e = T_{e0} + \hat{\delta}_e - \hat{\mu}_{c1} T_{tc1} - \hat{\mu}_{c2} T_{tc2}, \text{ where}$$

$J_e$: Engine moment of inertia
$\hat{\omega}_e$: Estimated engine angular acceleration
$T_{e0}$: Model engine torque
$\hat{\delta}_e$: Estimated engine torque error
$\hat{\mu}_{c1}$: Clutch characteristic variable of first clutch
$T_{tc1}$: Target clutch torque of first clutch
$\hat{\mu}_{c1} T_{tc1}$: Clutch torque of first clutch
$\hat{\mu}_{c2}$: Clutch characteristic variable of second clutch
$T_{tc2}$: Target clutch torque of second clutch
$\hat{\mu}_{c2} T_{tc2}$: Clutch torque of second clutch.

The first clutch model may be $$J'_{c1} \hat{\omega}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)},$$

where
$J'_{c1}$: Equivalent moment of inertia of first clutch
$\hat{\omega}_{c1}$: Estimated clutch angular acceleration of first clutch
$\hat{\mu}_{c1}$: Clutch characteristic variable of first clutch
$T_{tc1}$: Target clutch torque of first clutch
$\hat{\mu}_{c1} T_{tc1}$: Clutch torque of first clutch
$\hat{\mu}_{c2}$: Clutch characteristic variable of second clutch
$T_{tc2}$: Target clutch torque of second clutch
$\hat{\mu}_{c2} T_{tc2}$: Clutch torque of second clutch.
$\varphi_e$: Even-numbered gear stage (ex, 2-gear stage, 4-gear stage, 6-gear stage . . . )

$\varphi_o$: Odd-numbered gear stage (ex, 1-gear stage, 3-gear stage, 5-gear stage . . . )
$\gamma_T(\varphi_e)$: Gear ratio at gear stage $\varphi_e$
$\gamma_T(\varphi_o)$: Gear ratio at gear stage $\varphi_o$
$\hat{\omega}_w$: Estimated wheel angular velocity
$T_{so}(\hat{\omega}_{c1},\hat{\omega}_w)$: Torsional torque of driveshaft when odd-numbered gear stage is engaged $$T_{so}(\hat{\omega}_{c1}, \hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

$k_s$: Stiffness coefficient of driveshaft
$b_s$: Damping coefficient of driveshaft
$\hat{\omega}_1$: Estimated clutch angular velocity of first clutch.
The second clutch model may be $$J'_{c2}\hat{\dot{\omega}}_{c2} = \hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c2}, \hat{\omega}_w)}{\gamma_T(\varphi_e)},$$

where
$J'_{c2}$: Equivalent moment of inertia of second clutch
$\hat{\dot{\omega}}_{c2}$: Estimated clutch angular acceleration of second clutch
$\hat{\mu}_{c1}$: Clutch characteristic variable of first clutch
$T_{tc1}$: Target clutch torque of first clutch
$\hat{\mu}_{c1}T_{tc1}$: Clutch torque of first clutch
$\hat{\mu}_{c2}$: Clutch characteristic variable of second clutch
$T_{tc2}$: Target clutch torque of second clutch
$\hat{\mu}_{c2}T_{tc2}$: Clutch torque of second clutch
$\varphi_e$: Even-numbered gear stage (ex, 2-gear stage, 4-gear stage, 6-gear stage . . . )
$\varphi_o$: Odd-numbered gear stage (ex, 1-gear stage, 3-gear stage, 5-gear stage . . . )
$\gamma_T(\varphi_e)$: Gear ratio at gear stage $\varphi_e$
$\gamma_T(\varphi_o)$: Gear ratio at gear stage $\varphi_o$.
$\hat{\omega}_w$: Estimated wheel angular velocity
$T_{se}(\hat{\omega}_{c2},\hat{\omega}_w)$: Torsional torque of driveshaft when even-numbered gear stage is engaged $$T_{se}(\hat{\omega}_{c2}, \hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

$k_s$: Stiffness coefficient of driveshaft
$b_s$: Damping coefficient of driveshaft
$\hat{\omega}_{c2}$: Estimated clutch angular velocity of second clutch.
The vehicle model may be $J_v\hat{\dot{\omega}}_w = T_{sn}(\hat{\omega}_{ci},\hat{\omega}_w) - T_L(\hat{\omega}_w)$, where $J_v$: Equivalent moment of inertia of vehicle
$\hat{\dot{\omega}}_w$: Estimated wheel angular acceleration
$T_{sn}(\hat{\omega}_{ci},\hat{\omega}_w)$: $T_{so}(\hat{\omega}_{c1},\hat{\omega}_w)$ when an odd-numbered gear stage is engaged, $T_{se}(\hat{\omega}_{c2},\hat{\omega}_w)$ when an even-numbered gear stage is engaged
n=o or e, i=1 or 2

$$T_{so}(\hat{\omega}_{c1}, \hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

$T_{so}$: Torsional torque of driveshaft when odd-numbered gear stage is engaged $\hat{\omega}_{c1}$: Estimated clutch angular velocity of first clutch
$\hat{\omega}_w$: Estimated wheel angular velocity
$k_s$: Stiffness coefficient of driveshaft
$b_s$: Damping coefficient of driveshaft
$\omega_{c1}$: Measured clutch angular velocity of first clutch
$\omega_o$: Odd-numbered gear stage (ex, 1-gear stage, 3-gear stage, 5-gear stage . . . )
$\gamma_T(\varphi_o)$: Gear ratio at gear stage $\varphi_o$ $$T_{se}(\hat{\omega}_{c2}, \hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

$T_{se}$: Torsional torque of driveshaft when even-numbered gear stage is engaged
$\hat{\omega}_{c2}$: Estimated clutch angular velocity of second clutch
$\omega_{c2}$: Measured clutch angular velocity of second clutch
$\varphi_e$: Even-numbered gear stage (ex, 2-gear stage, 4-gear stage, 6-gear stage . . . )
$\gamma_T(\varphi_e)$: Gear ratio at gear stage $\varphi_e$
$T_L(\omega_w)$: Vehicle load.
The clutch friction force characteristic model of the first clutch may be $\hat{\mu}_{c1}(\hat{\omega}_{s1},\hat{z}_{c1}) = \sigma_{c10}\hat{z}_{c1} + \sigma_{c11}\hat{\dot{z}}_{c1} + \sigma_{c12}\hat{\omega}_{s1}$, where $\hat{\omega}_{s1} = \hat{\omega}_e - \hat{\omega}_{c1}$, $$\hat{\dot{z}}_{c1} = \hat{\omega}_{s1} - \sigma_{c10}\frac{|\hat{\omega}_{s1}|}{g(\hat{\omega}_{s1})}\hat{z}_{c1},$$

$\hat{\mu}_{c1}$: Clutch characteristic variable of first clutch
$\hat{\omega}_{s1}$: Estimated clutch slip of first clutch
$\hat{\omega}_e$: Estimated engine angular velocity
$\sigma_{c1}$: Estimated clutch angular velocity of first clutch
$\sigma_{c10}$: Stiffness coefficient against internal friction force of first clutch
$\hat{\omega}_{c11}$: Damping coefficient against internal friction force of first clutch
$\hat{\omega}_{c12}$: Damping coefficient for slip of first clutch
$z_{c1}$: Internal variable for determining friction force of first clutch
$g(\hat{\omega}_{s1})$: Friction force according to slip of first clutch when a change of $z_{c1}$ is 0 (normal state)

$g(\hat{\omega}_{s1}) = f_{c1c} + (f_{c1s} - f_{c1c})e^{-(\hat{\omega}_{s1}/\hat{\omega}_{cs})^2}$ $f_{c1c}$: Coefficient of kinetic friction of first clutch
$f_{c1s}$: Coefficient of static friction of first clutch
$\omega_{cs}$: Critical slip velocity (threshold velocity for discriminating static friction and kinetic friction).
The clutch friction force characteristic model of the second clutch may be $\hat{\mu}_{c2}(\hat{\omega}_{s2},\hat{z}_{c2}) = \sigma_{c20}\hat{z}_{c2} + \sigma_{c21}\hat{\dot{z}}_{c1} + \sigma_{c12}\hat{\omega}_{s2}$, where $\hat{\omega}_{s2} = \hat{\omega}_e - \hat{\omega}_{c2}$ $$\hat{\dot{z}}_{c2} = \hat{\omega}_{s2} - \sigma_{c20}\frac{|\hat{\omega}_{s2}|}{g(\hat{\omega}_{s2})}\hat{z}_{c2}$$

$\hat{\mu}_{c2}$: Clutch characteristic variable of second clutch
$\hat{\omega}_{s2}$: Estimated clutch slip of second clutch
$\hat{\omega}_e$: Estimated engine angular velocity
$\hat{\omega}_{c2}$: Estimated clutch angular velocity of second clutch $\sigma_{c20}$: Stiffness coefficient against internal friction force of second clutch $\sigma_{c21}$: Damping coefficient against internal friction force of second clutch $\sigma_{c22}$: Damping coefficient for slip of second clutch $z_{c2}$: Internal variable for determining friction force of second clutch $g(\hat{\omega}_{s2})$: Friction force according to slip of second clutch when a change of $z_{c2}$ is 0 (normal state)

$$g(\hat{\omega}_{s2}) = f_{c2c} + (f_{c2s} - f_{c2c})e^{-(\hat{\omega}_{s1}/\hat{\omega}_{cs})^2}$$

$f_{c2c}$: Coefficient of kinetic friction of second clutch $f_{c2s}$: Coefficient of static friction of second clutch $\omega_{cs}$: Critical slip velocity (threshold velocity for discriminating static friction and kinetic friction).

The present invention makes it possible to further improve launch performance and shifting quality of a vehicle by more accurately estimating clutch torque of a dry clutch which is used for a DCT, being able to improve the commercial value of the vehicle.

Furthermore, according to an exemplary embodiment of the present invention, it is possible to estimate and find out clutch torque even without a sensor for measuring clutch torque, so that the present invention may be used to compensate for or learn a T-S curve map of the related art. Furthermore, it is possible to control clutches without a T-S curve map.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a diagram expressing in detail a powertrain model of FIG. 2.

Figure 1:
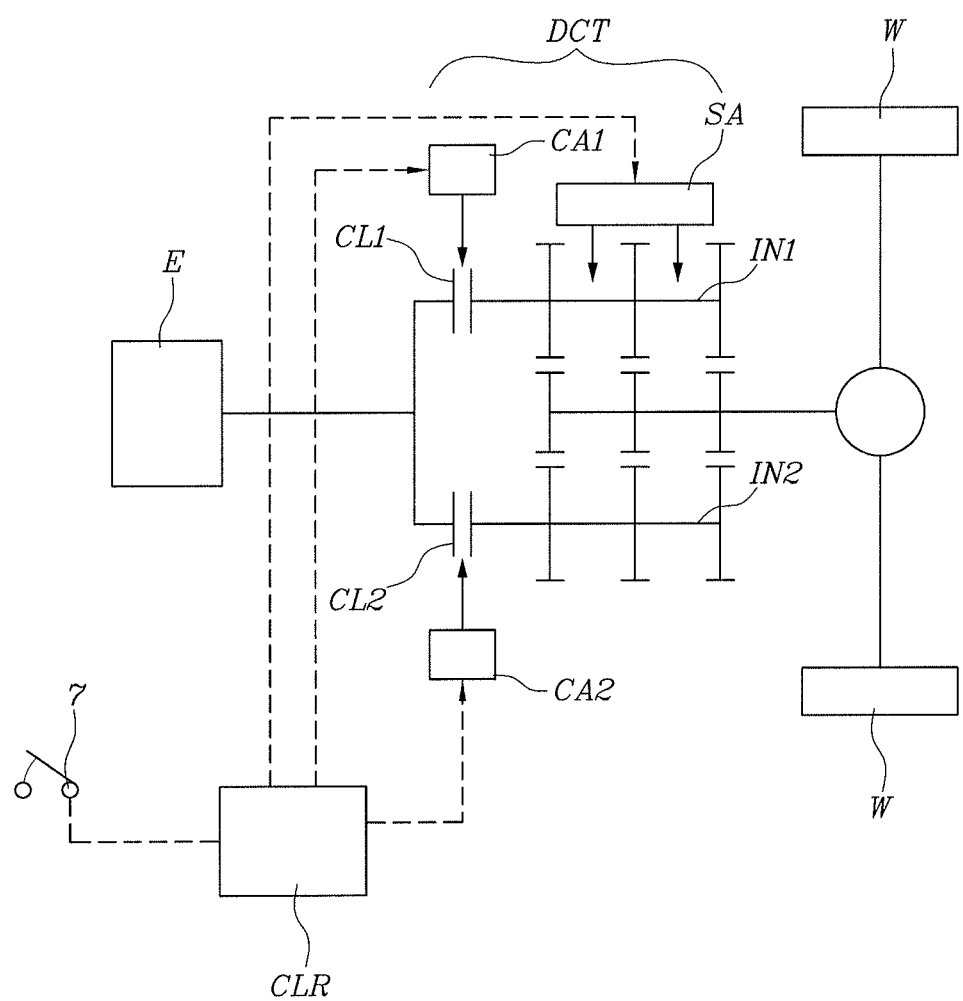
FIG. 1 is a diagram showing the configuration of a vehicle with a dual-clutch transmission (DCT) to which an exemplary embodiment of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a diagram showing the configuration of a vehicle with a DCT to which an exemplary embodiment of the present invention may be applied, in which power from an engine E is transmitted to a first input shaft IN1 and a second input shaft IN2 of a DCT through a first clutch CL1 and a second clutch CL2, respectively, and then supplied to driving wheels W through an output OUT after shifting.

Furthermore, a clutch actuator CA1 of a first clutch and a clutch actuator CA2 of a second clutch are provided to drive the first clutch CL1 and the second clutch CL2, respectively, and a shifting actuator SA for performing shifting using a selecting and shifting function is provided. These actuators are controller by a controller CLR for automatic shifting.

The controller CLR receives an accelerator pedal operation amount by a driver through an Accelerator Position Sensor (APS) 7, receives information such as the engine velocity and torque, the vehicle velocity, etc., and controls the clutch actuator CA1 of the first clutch, the clutch actuator CA2 of the second clutch, and the shifting actuator SA such that the dual-clutch transmission (DCT) automatically performs shifting to be fitted to the driving situation of the vehicle.

For example, to achieve clutch torque of 50 Nm through the first clutch, the controller find out a clutch actuator stroke corresponding to 50 Nm from a T-S curve map provided in advance for the first clutch and then controls the clutch actuator to operate by the stroke, whereby the first clutch is controlled to generate clutch torque of 50 Nm.

The engine is controlled by a separate Engine Management System (EMS) and the controller CLR can receive information related to the engine by communicating with the EMS.

For reference, the controller CLR described above may be a Transmission Management System (TMS), and in some cases, it may be an integrated control system of the EMS and the TMS.

The DCT implements odd-numbered gear stages such as a 1-gear stage, a 3-gear stage, and a 5-gear state of a series of gear stages and even-numbered gear stages such as a 2-gear stage, a 4-gear stage, and a 6-gear stage through different input shafts and clutches. For example, the first clutch and the first input shaft are designed to implement the odd-numbered gear stages, and the second clutch and the second input shaft are designed to implement the even-numbered gear stages. Accordingly, when shifting is sequentially performed, for example, from the 3-gear stage to the 4-gear stage, the first clutch is disengaged and the second clutch is engaged, preventing torque interruption and securing smooth shifting.

In shifting, the clutch which is disengaged such as the first clutch is called a disengaging clutch and the clutch which is engaged such as the second clutch is called an engaging clutch. Accordingly, the input shaft connected to the disengaging clutch is also called a disengaging input shaft and the input shaft connected to the engaging clutch is also called an engaging input shaft.

Figure 2:
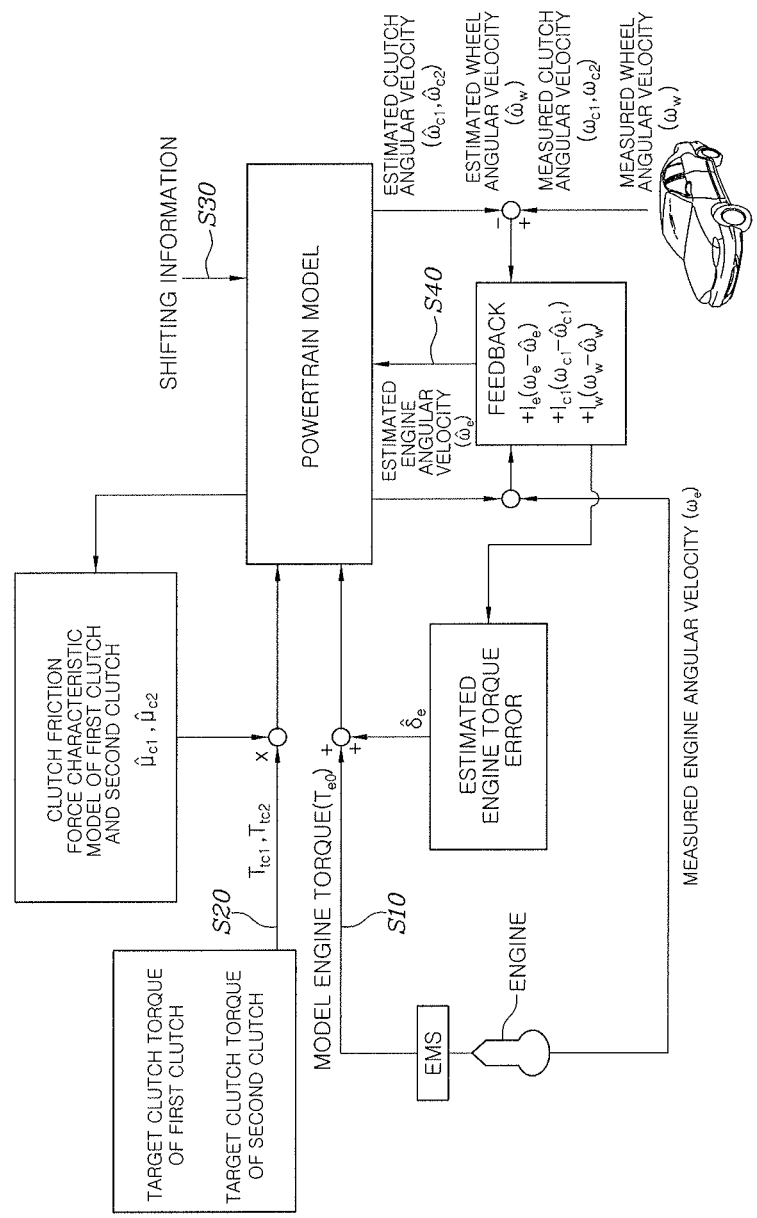
FIG. 2 is a conceptual diagram illustrating a clutch torque estimating method for a transmission of a vehicle according to an exemplary embodiment of the present invention.

Referring to FIG. 2, an exemplary embodiment of a clutch torque estimating method for a transmission of a vehicle of the present invention include: inputting model engine torque to a powertrain model by a controller (S10); inputting target clutch torque of a first clutch and target clutch torque of a second clutch to the powertrain model by the controller (S20); inputting shifting information related to the vehicle to the powertrain model by the controller (S30); correcting the powertrain model in real time by feeding back an engine angular velocity error which is the difference between a measured engine angular velocity and an estimated engine angular velocity determined from the powertrain model, a clutch angular velocity error of the first clutch which is the difference between a measured clutch angular velocity of the first clutch and an estimated clutch angular velocity of the first clutch determined from the powertrain model, a clutch angular velocity error of the second clutch which is the difference between a measured clutch angular velocity of the second clutch and an estimated clutch angular velocity of the second clutch determined from the powertrain model, and a wheel angular velocity error which is the difference between a measured wheel angular velocity and an estimated wheel angular velocity determined from the powertrain model, to the powertrain model by the controller (S40); estimating clutch torque of the first clutch and clutch torque of the second clutch by determining the powertrain model by the controller; and controlling the first clutch and the second clutch using the estimated clutch torque of the first clutch and the estimated clutch torque of the second clutch by the controller.

The powertrain model may include an engine model determined according to engine dynamics; a first clutch model and a second clutch model determined according to clutch dynamics; and a vehicle model determined according to vehicle dynamics.

That is, various aspects of the present invention provide a powertrain model including the engine model, the first clutch model, the second clutch model, and the vehicle model, inputting model engine torque, target clutch torque of the first clutch, target clutch torque of the second clutch, vehicle shifting information to the powertrain model, corrects the powertrain model in real time by feeding back an engine angular velocity error, a clutch angular velocity error of the first clutch, a clutch angular velocity error of the second clutch, and a wheel angular velocity error to the powertrain model, and estimate clutch torque of the first clutch and clutch torque of the second clutch from the powertrain.

When estimating the clutch torque of the first clutch and the clutch torque of the second clutch, the present invention estimates the clutch torque of the first clutch and the clutch torque of the second clutch on the basis of more detailed and accurate information related to the state of a vehicle by use of the powertrain model including the engine model, the first clutch model, the second clutch model, and the vehicle model. Accordingly, it is possible to more accurately estimate the clutch torque of the clutches in a wider operation period. Therefore, launch performance and shifting quality of a vehicle are improved, increasing the commercial value of the vehicle.

For reference, the measured engine angular velocity may be measured by a crank angle sensor, the measured clutch angular velocity of the first clutch may be measured by a sensor that measures the rotational velocity of the first input shaft connected to the first clutch, the measured clutch angular velocity of the second clutch may be measured by a sensor that measures the rotational velocity of the second input shaft connected to the second clutch, and the measured wheel angular velocity may be measured by a wheel velocity sensor mounted on a wheel of a vehicle.

The model engine torque, which is provided from the EMS to the controller, means the fuel amount which is controlled by the EMS in accordance with the vehicle state such as an APS signal according to the acceleration pedal operation state by a driver, and a torque which is expected to be output from the engine in accordance with the ignition time.

That is, the model engine torque is not actual engine torque, but engine torque determined from a map or a model of engine output torque for an engine control amount such as a fuel amount and ignition time by the EMS and transmitted to the controller through Controller Area Network (CAN) communication etc.

The model engine torque is configured to be input to the powertrain model together with an estimated engine torque error determined by cumulative-integrating the engine angular velocity error.

That is, there may be a difference between the model engine torque and the actual engine torque, so that the difference is corrected by the estimated engine torque error to engine torque closer to the actual engine torque to the engine model of the powertrain model.

The estimated engine torque may be determined from the following Formula 1.

$$\hat{\delta}_e = \int_0^t l_{ei}(\omega_e - \hat{\omega}_e)d\tau \quad \text{[Formula 1]}$$

where, $\hat{\delta}_e$: Estimated engine torque error
$\omega_e$: Measured engine angular velocity
$\hat{\omega}_e$: Estimated engine angular velocity
$l_{ei}$: Feedback gain for engine angular velocity The engine model forming the powertrain model may be expressed as the following Formula 2.

$$J_e\dot{\hat{\omega}}_e = T_{e0} + \hat{\delta}_e - \hat{\mu}_{c1}T_{tc1} - \hat{\mu}_{c2}T_{tc2}, \text{ where} \quad \text{[Formula 2]}$$

$J_e$: Engine moment of inertia
$\dot{\hat{\omega}}_e$: Estimated engine angular acceleration
$T_{e0}$: Model engine torque
$\hat{\delta}_e$: Estimated engine torque error
$\hat{\mu}_{c1}$: Clutch characteristic variable of first clutch
$T_{tc1}$: Target clutch torque of first clutch
$\hat{\mu}_{c1}T_{tc1}$: Clutch torque of first clutch
$\hat{\mu}_{c2}$: Clutch characteristic variable of second clutch
$T_{tc2}$: Target clutch torque of second clutch
$\hat{\mu}_{c2}T_{tc2}$: Clutch torque of second clutch.

Real-time correction by feeding back the engine angular velocity error to the engine model may be expressed as the following Formula 3.

$$J_e\dot{\hat{\omega}}_e = T_{e0} + \hat{\delta}_e - \hat{\mu}_{c1}T_{tc1} - \hat{\mu}_{c2}T_{tc2} + l_e(\omega_e - \hat{\omega}_e) \quad \text{[Formula 3]}$$

where, $\omega_e$: Measured engine angular velocity
$\hat{\omega}_e$: Estimated engine angular velocity
$l_e$: Observer feedback gain for engine angular velocity error
$\omega_e - \hat{\omega}_e$: Engine angular velocity error.

Under the theoretical assumption that a difference between the engine model and the actual engine dynamics has been reflected to a difference between the actually measured engine angular velocity and the estimated engine angular velocity determined from a model, correction which is performed by feeding back the engine angular velocity error to the engine model by the controller is based on that when the difference is repeatedly multiplied by an appropriate observer feedback gain, the difference gradually decreases and the engine model will be closer to the actual engine dynamics.

For reference, the present invention estimates $\hat{\mu}_{c1}T_{tc1}$ which is the clutch torque of the first clutch and $\hat{\mu}_{c2}T_{tc2}$ which is the clutch torque of the second clutch in the above Formulae to use them for controlling the first clutch and the second clutch.

Figure 4:
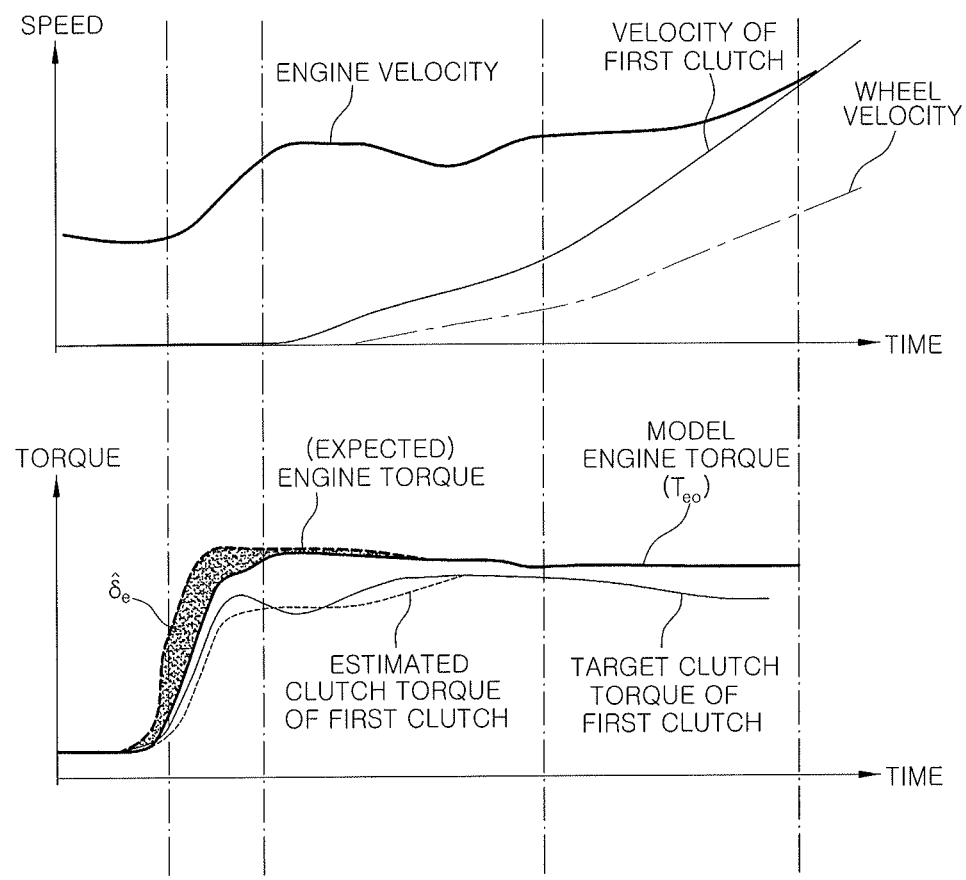
FIG. 4 is a graph illustrating clutch torque which is estimated when a vehicle is launched in accordance with various aspects of the present invention.

Using the estimated clutch torque of the first clutch and the estimated clutch torque of the second clutch for controlling the first clutch and the second clutch may mean ignoring the target clutch torque and using the estimated clutch torque, or comparing the target clutch torque and the estimated clutch torque and using an intermediate value, when a problem may be caused due to a large difference between the actual clutch torque and the target clutch torque output from the T-S curve map, for example, in launching of a vehicle exemplified in FIG. 4.

The target clutch torque of the first clutch is multiplied by the clutch characteristic variable of the first clutch determined by a clutch friction force characteristic model of the first clutch and is then input to the powertrain model.

The target clutch torque of the second clutch is multiplied by the clutch characteristic variable of the second clutch determined by a clutch friction force characteristic model of the second clutch and is then input to the powertrain model.

The first clutch model may be expressed as the following Formula 4.

$$J'_{c1}\dot{\hat{\omega}}_{c1} = \hat{\mu}_{c1}T_{tc1} + \frac{\gamma_T(\varphi_e)}{\gamma_T(\varphi_o)}\hat{\mu}_{c2}T_{tc2} - \frac{T_{so}(\hat{\omega}_{c1}, \hat{\omega}_w)}{\gamma_T(\varphi_o)} \quad [\text{Formula 4}]$$

where $J'_{c1}$: Equivalent moment of inertia of first clutch $\dot{\hat{\omega}}_{c1}$: Estimated clutch angular acceleration of first clutch $\hat{\mu}_{c1}$: Clutch characteristic variable of first clutch $T_{tc1}$: Target clutch torque of first clutch $\hat{\mu}_{c1}T_{tc1}$: Clutch torque of first clutch $\hat{\mu}_{c2}$: Clutch characteristic variable of second clutch $T_{tc2}$: Target clutch torque of second clutch $\hat{\mu}_{c2}T_{tc2}$: Clutch torque of second clutch $\varphi_e$: Even-numbered gear stage (ex, 2-gear stage, 4-gear stage, 6-gear stage ... )

$\varphi_o$: Odd-numbered gear stage (ex, 1-gear stage, 3-gear stage, 5-gear stage ... )

$\gamma_T(\varphi_e)$: Gear ratio at gear stage $\varphi_e$.

$\gamma_T(\varphi_o)$: Gear ratio at gear stage $\varphi_o$ $\hat{\omega}_w$: Estimated wheel angular velocity $T_{so}(\hat{\omega}_{c1},\hat{\omega}_w)$: Torsional torque of driveshaft when odd-numbered gear stage is engaged $$T_{so}(\hat{\omega}_{c1}, \hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

$k_s$: Stiffness coefficient of driveshaft $b_s$: Damping coefficient of driveshaft $\hat{\omega}_{c1}$: Estimated clutch angular velocity of first clutch.

Real-time correction by feeding back the clutch angular velocity error of the first clutch to the first clutch model may be expressed as the following Formula 5.

$$J'_{c1}\dot{\hat{\omega}}_{c1} = \hat{\mu}_{c1}T_{tc1} + \frac{\gamma_T(\varphi_e)}{\gamma_T(\varphi_o)}\hat{\mu}_{c2}T_{tc2} - \frac{T_{so}(\hat{\omega}_{c1}, \hat{\omega}_w)}{\gamma_T(\varphi_o)} + l_{c1}(\omega_{c1} - \hat{\omega}_{c1}) \quad [\text{Formula 5}]$$

where, $\omega_{c1}$: Measured clutch angular velocity of first clutch $l_{c1}$: Observer feedback gain for clutch angular velocity of first clutch $\omega_{c1} - \hat{\omega}_{c1}$: Clutch angular velocity error of first clutch.

Under the theoretical assumption that a difference between the first clutch model and the actual first clutch dynamics has been reflected to a difference between the actually measured clutch angular velocity of the first clutch and the estimated clutch angular velocity determined from the first clutch model, correction which is performed by feeding back the clutch angular velocity error of the first clutch to the first clutch model by the controller is based on that when the difference is repeatedly multiplied by an appropriate observer feedback gain, the difference gradually decreases and the first clutch model will be closer to the first clutch dynamics.

The second clutch model may be expressed as the following Formula 6.

$$J'_{c2}\dot{\hat{\omega}}_{c2} = \hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c2}, \hat{\omega}_w)}{\gamma_T(\varphi_e)} \quad [\text{Formula 6}]$$

where, $J'_{c2}$: Equivalent moment of inertia of second clutch $\dot{\hat{\omega}}_{c2}$: Estimated clutch angular acceleration of second clutch $\hat{\mu}_{c1}$: Clutch characteristic variable of first clutch $T_{tc1}$: Target clutch torque of first clutch $\hat{\mu}_{c1}T_{tc1}$: Clutch torque of first clutch $\hat{\mu}_{c2}$: Clutch characteristic variable of second clutch $T_{tc2}$: Target clutch torque of second clutch $\hat{\mu}_{c2}T_{tc2}$: Clutch torque of second clutch $\varphi_e$: Even-numbered gear stage (ex, 2-gear stage, 4-gear stage, 6-gear stage ... )

$\varphi_o$: Odd-numbered gear stage (ex, 1-gear stage, 3-gear stage, 5-gear stage ... )

$\gamma_T(\varphi_e)$: Gear ratio at gear stage $\varphi_e$ $\gamma_T(\varphi_o)$: Gear ratio at gear stage $\varphi_o$ $\hat{\omega}_w$: Estimated wheel angular velocity $T_{se}(\hat{\omega}_{c2},\hat{\omega}_w)$: Torsional torque of driveshaft when even-numbered gear stage is engaged $$T_{se}(\hat{\omega}_{c2}, \hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

$k_s$: Stiffness coefficient of driveshaft $b_s$: Damping coefficient of driveshaft $\hat{\omega}_{c2}$: Estimated clutch angular velocity of second clutch.

Real-time correction by feeding back the clutch angular velocity error of the second clutch to the second clutch model may be expressed as the following Formula 7.

$$J'_{c2}\dot{\hat{\omega}}_{c2} = \hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c2},\hat{\omega}_w)}{\gamma_T(\varphi_e)} + l_{c2}(\omega_{c2} - \hat{\omega}_{c2})$$ [Formula 7]

where, $\omega_{c2}$: Measured clutch angular velocity of second clutch $l_{c2}$: Observer feedback gain for angular velocity of second clutch $\omega_{c2} - \hat{\omega}_{c2}$: Clutch angular velocity error of second clutch Under the theoretical assumption that a difference between the second clutch model and the actual second clutch dynamics has been reflected to a difference between the actually measured clutch angular velocity of the second clutch and the estimated clutch angular velocity determined from the second clutch model, correction which is performed by feeding back the clutch angular velocity error of the second clutch to the second clutch model by the controller is based on that when the difference is repeatedly multiplied by an appropriate observer feedback gain, the difference gradually decreases and the second clutch model will be closer to the second clutch dynamics.

The clutch friction force characteristic model of the first clutch may be expressed as the following Formula 8.

$$\hat{\mu}_{c1}(\hat{\omega}_{s1},\hat{z}_{c1}) = \sigma_{c10}\hat{z}_{c1} + \sigma_{c11}\hat{z}_{c1} + \sigma_{c12}\hat{\omega}_{s1}, \text{ where}$$

$$\hat{\omega}_{s1} = \hat{\omega}_e - \hat{\omega}_{c1}$$

$$\dot{\hat{z}}_{c1} = \hat{\omega}_{s1} - \sigma_{c10}\frac{|\hat{\omega}_{s1}|}{g(\hat{\omega}_{s1})}\hat{z}_{c1}$$

$\hat{\mu}_{c1}$: Clutch characteristic variable of first clutch
$\hat{\omega}_{s1}$: Estimated clutch slip of first clutch
$\hat{\omega}_e$: Estimated engine angular velocity
$\hat{\omega}_{c1}$: Estimated clutch angular velocity of first clutch
$\sigma_{c10}$: Stiffness coefficient against internal friction force of first clutch
$\sigma_{c11}$: Damping coefficient against internal friction force of first clutch
$\sigma_{c12}$: Damping coefficient for slip of first clutch
$z_{c1}$: Internal variable for determining friction force of first clutch
$g(\hat{\omega}_{s1})$: $z_{c1}$ Friction force according to slip of first clutch when a change of $z_{c1}$ is 0 (normal state)

$$g(\hat{\omega}_{s1}) = f_{c1c} + (f_{c1s} - f_{c1c})e^{-(\hat{\omega}_{s1}/\hat{\omega}_{cs})^2}$$

$f_{c1c}$: Coefficient of kinetic friction of first clutch
$f_{c1s}$: Coefficient of static friction of first clutch
$\omega_{cs}$: Critical slip velocity (threshold velocity for discriminating static friction and kinetic friction).

The clutch friction force characteristic model of the second clutch may be expressed as the following Formula 9.

$$\hat{\mu}_{c2}(\hat{\omega}_{s2},\hat{z}_{c2}) = \sigma_{c20}\hat{z}_{c2} + \sigma_{c21}\hat{z}_{c2} + \sigma_{c22}\hat{\omega}_{s2}, \text{ where}$$

$$\hat{\omega}_{s2} = \hat{\omega}_e - \hat{\omega}_{c2}$$ [Formula 9]

$$\dot{\hat{z}}_{c2} = \hat{\omega}_{s2} - \sigma_{c20}\frac{|\hat{\omega}_{s2}|}{g(\hat{\omega}_{s2})}\hat{z}_{c2}$$

$\hat{\mu}_{c2}$: Clutch characteristic variable of second clutch
$\hat{\omega}_{s2}$: Estimated clutch slip of second clutch
$\hat{\omega}_e$: Estimated engine angular velocity
$\omega_{c2}$: Estimated clutch angular velocity of second clutch
$\sigma_{c20}$: Stiffness coefficient against internal friction force of second clutch
$\sigma_{c21}$: Damping coefficient against internal friction force of second clutch
$\sigma_{c22}$: Damping coefficient for slip of second clutch
$z_{c2}$: Internal variable for determining friction force of second clutch
$g(\hat{\omega}_{s2})$: $z_{c2}$ Friction force according to slip of second clutch when a change of $z_{c2}$ is 0 (normal state)

$$g(\hat{\omega}_{s2}) = f_{c2c} + (f_{c2s} - f_{c2c})e^{-(\hat{\omega}_{s2}/\hat{\omega}_{cs})^2}$$

$f_{c2c}$: Coefficient of kinetic friction of second clutch
$f_{c2s}$: Coefficient of static friction of second clutch
$\omega_{cs}$: Critical slip velocity (threshold velocity for discriminating static friction and kinetic friction).

Figure 3:
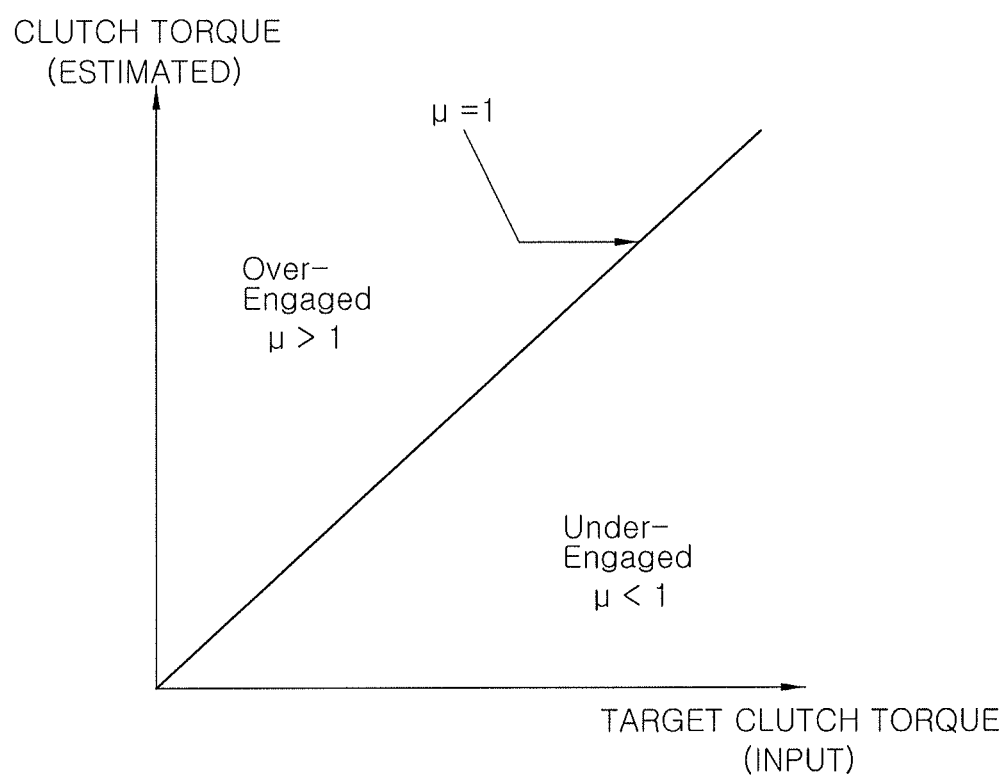
FIG. 3 is a graph illustrating the meaning of a clutch characteristic variable.

The clutch characteristic variable $\hat{\mu}_{c1}$ of the first clutch and the clutch characteristic variable $\hat{\mu}_{c2}$ of the second clutch that are obtained, as described above, have the characteristics shown in FIG. 3. For reference, $\mu = \mu_{c1} = \mu_{c2}$ in FIG. 3.

That is, $\mu=1$ means that a clutch has been engaged by a target, so that the target clutch torque input by the controller and the clutch torque estimated from the powertrain model are the same, $\mu<1$ means under-engaging in which a clutch has not been engaged less than a target, and $\mu>1$ means over-engaging in which a clutch has been engaged more than a target.

For reference, the clutch friction force characteristic models of the first clutch and the second clutch refer to a reference document (C. Canudas de Wit, H. Olsson, K. J. Astrom, P. Lischinsky, "A new model for control of systems with friction", IEEE Transaction on Automatic Control, Vol. 40, No. 3, 1995).

The vehicle model may be expressed as the following Formula 10.

$$J_v\dot{\hat{\omega}}_w = T_{sn}(\hat{\omega}_{ci},\hat{\omega}_w) - T_L(\hat{\omega}_w), \text{ where}$$ [Formula 10]

$J_v$: Equivalent moment of inertia of vehicle
$\dot{\hat{\omega}}_w$: Estimated wheel angular acceleration
$T_{sn}(\hat{\omega}_{ci},\hat{\omega}_w)$: $T_{so}(\hat{\omega}_{c1},\hat{\omega}_w)$ when an odd-numbered gear stage is engaged, $T_{se}(\hat{\omega}_{c2},\hat{\omega}_w)$ when an even-numbered gear stage is engaged
n=o or e, i=1 or 2
$T_L(\hat{\omega}_w)$: Vehicle load
$\hat{\omega}_w$: Estimated wheel angular velocity.

Real-time correction by feeding back the wheel angular velocity error of a vehicle to the vehicle model may be expressed as the following Formula 11.

$$J_v\dot{\hat{\omega}}_w = T_{sn}(\hat{\omega}_{ci},\hat{\omega}_w) - T_L(\hat{\omega}_w) + l_w(\omega_w - \hat{\omega}_w), \text{ where}$$ [Formula 11]

$\omega_w$: Estimated wheel angular velocity
$l_w$: Observer feedback gain for vehicle wheel angular velocity error The vehicle load $T_L$ may be determined by the following Formula 12.

$$T_L(\hat{\omega}_w) = r_w(K_rM_vg\cos\theta_r - \tfrac{1}{2}\rho C_dA_Fr_w^2\hat{\omega}_w^2 - M_vg\sin\theta_r)$$ [Formula 12]

where,
$r_w$: dynamic rolling radius of vehicle wheel
$K_r$: Rolling resistance coefficient
$M_v$: Mass of vehicle
g: Acceleration of gravity
$\theta_r$: Gradient of road
$\rho$: Air density
$C_d$: Drag coefficient $A_F$: Frontal area of vehicle.

For reference, the shifting information which is input to the powertrain model by the controller is used for the first clutch model, the second clutch model, and the vehicle model, as described above.

In the step in which the controller estimates the clutch torque of the first clutch and the clutch torque of the second clutch by determining the powertrain model, it is possible to estimate the clutch torque of the first clutch and the clutch torque of the second clutch by determining the engine model, the first clutch model, the second clutch model, and the vehicle model using numerical integration etc.

According to an exemplary embodiment of the present invention described above, when the engine of a vehicle starts and the controller that is configured to control the DCT starts to operate, an initial value is immediately set, the clutch torque of the first clutch and the second clutch described above is estimated, and is used to control the first clutch and the second clutch, for example, through comparison with target clutch torque which is determined by a T-S curve map. The present operation is repeated until the controller stops operating due to stopping of the vehicle or the engine.

The initial value may be set as measurement values of various sensors, a T-S curve map, information from an EMS, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clutch torque estimating method for a transmission of a vehicle, the clutch torque estimating method comprising:
    inputting model engine torque to a powertrain model by a controller;
    inputting target clutch torque of a first clutch and target clutch torque of a second clutch to the powertrain model by the controller;
    inputting shifting information related to the vehicle to the powertrain model by the controller;
    correcting the powertrain model in real time by feeding back an engine angular velocity error which is a difference between a measured engine angular velocity and an estimated engine angular velocity determined from the powertrain model, a clutch angular velocity error of the first clutch which is a difference between a measured clutch angular velocity of the first clutch and an estimated clutch angular velocity of the first clutch determined from the powertrain model, a clutch angular velocity error of the second clutch which is a difference between a measured clutch angular velocity of the second clutch and an estimated clutch angular velocity of the second clutch determined from the powertrain model, and a wheel angular velocity error which is a difference between a measured wheel angular velocity and an estimated wheel angular velocity determined from the powertrain model, to the powertrain model by the controller;
    estimating clutch torque of the first clutch and clutch torque of the second clutch by determining the powertrain model by the controller; and
    controlling the first clutch and the second clutch using the estimated clutch torque of the first clutch and the estimated clutch torque of the second clutch by the controller.

2. The clutch torque estimating method of claim 1, wherein the powertrain model includes:
    an engine model determined according to engine dynamics;
    a first clutch model and a second clutch model determined according to clutch dynamics; and
    a vehicle model determined according to vehicle dynamics.

3. The clutch torque estimating method of claim 2, wherein the model engine torque is configured to be input to the powertrain model with an estimated engine torque error determined by cumulative-integrating the engine angular velocity error.

4. The clutch torque estimating method of claim 3,
    wherein the target clutch torque of the first clutch is multiplied by a clutch characteristic variable of the first clutch determined by a clutch friction force characteristic model of the first clutch and is then input to the powertrain model, and
    wherein the target clutch torque of the second clutch is multiplied by a clutch characteristic variable of the second clutch determined by a clutch friction force characteristic model of the second clutch and is then input to the powertrain model.

5. The clutch torque estimating method of claim 4, wherein the engine model is $$J_e \hat{\omega}_e = T_{e0} + \hat{\delta}_e - \hat{\mu}_{c1} T_{tc1} - \hat{\mu}_{c2} T_{tc2}, \text{ where}$$

$J_e$: Engine moment of inertia
$\hat{\omega}_e$: Estimated engine angular acceleration
$T_{e0}$: Model engine torque
$\hat{\delta}_e$: Estimated engine torque error
$\hat{\mu}_{c1}$: Clutch characteristic variable of first clutch
$T_{tc1}$: Target clutch torque of first clutch
$\hat{\mu}_{c1} T_{tc1}$: Clutch torque of first clutch
$\hat{\mu}_{c2}$: Clutch characteristic variable of second clutch
$T_{tc2}$: Target clutch torque of second clutch
$\hat{\mu}_{c2} T_{tc2}$: Clutch torque of second clutch.

6. The clutch torque estimating method of claim 4, wherein the first clutch model is $$J'_{c1} \hat{\omega}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)},$$

where
- $J'_{c1}$: Equivalent moment of inertia of first clutch
- $\hat{\omega}_{c1}$: Estimated clutch angular acceleration of first clutch
- $\hat{\mu}_{c1}$: Clutch characteristic variable of first clutch
- $T_{tc1}$: Target clutch torque of first clutch
- $\hat{\mu}_{c1}T_{tc1}$: Clutch torque of first clutch
- $\hat{\mu}_{c2}$: Clutch characteristic variable of second clutch
- $T_{tc2}$: Target clutch torque of second clutch
- $\hat{\mu}_{c2}T_{tc2}$: Clutch torque of second clutch
- $\varphi_e$: Even-numbered gear stage (ex, 2-gear stage, 4-gear stage, 6-gear stage . . . )
- $\varphi_o$: Odd-numbered gear stage (ex, 1-gear stage, 3-gear stage, 5-gear stage . . . )
- $\gamma_T(\varphi_e)$: Gear ratio at gear stage $\varphi_e$
- $\gamma_T(\varphi_o)$: Gear ratio at gear stage $\varphi_o$
- $\hat{\omega}_w$: Estimated wheel angular velocity
- $T_{so}(\hat{\omega}_{c1},\hat{\omega}_w)$: Torsional torque of driveshaft when odd-numbered gear stage is engaged $$T_{so}(\hat{\omega}_{c1},\hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

- $k_s$: Stiffness coefficient of driveshaft
- $b_s$: Damping coefficient of driveshaft
- $\hat{\omega}_{c1}$: Estimated clutch angular velocity of first clutch.

7. The clutch torque estimating method of claim 4, wherein the second clutch model is $$J'_{c2}\hat{\omega}_{c2} = \hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c2},\hat{\omega}_w)}{\gamma_T(\varphi_e)},$$

where
- $J'_{c2}$: Equivalent moment of inertia of second clutch
- $\hat{\omega}_{c2}$: Estimated clutch angular acceleration of second clutch
- $\hat{\mu}_{c1}$: Clutch characteristic variable of first clutch
- $T_{tc1}$: Target clutch torque of first clutch
- $\hat{\mu}_{c1}T_{tc1}$: Clutch torque of first clutch
- $\hat{\mu}_{c2}$: Clutch characteristic variable of second clutch
- $T_{tc2}$: Target clutch torque of second clutch
- $\hat{\mu}_{c2}T_{tc2}$: Clutch torque of second clutch
- $\varphi_e$: Even-numbered gear stage (ex, 2-gear stage, 4-gear stage, 6-gear stage . . . )
- $\varphi_o$: Odd-numbered gear stage (ex, 1-gear stage, 3-gear stage, 5-gear stage . . . )
- $\gamma_T(\varphi_e)$: Gear ratio at gear stage $\varphi_e$
- $\delta_T(\varphi_o)$: Gear ratio at gear stage $\varphi_o$
- $\hat{\omega}_w$: Estimated wheel angular velocity
- $T_{se}(\hat{\omega}_{c2},\hat{\omega}_w)$: Torsional torque of driveshaft when even-numbered gear stage is engaged $$T_{se}(\hat{\omega}_{c2},\hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

- $k_s$: Stiffness coefficient of driveshaft
- $b_s$: Damping coefficient of driveshaft
- $\hat{\omega}_{c2}$: Estimated clutch angular velocity of second clutch.

8. The clutch torque estimating method of claim 4, wherein the vehicle model is $$J_v\hat{\omega}_w = T_{sn}(\hat{\omega}_{ci},\hat{\omega}_w) - T_L(\hat{\omega}_w), \text{ where}$$

- $J_v$: Equivalent moment of inertia of vehicle
- $\hat{\omega}_w$: Estimated wheel angular acceleration
- $T_{sn}(\hat{\omega}_{ci},\hat{\omega}_w)$: $T_{so}(\hat{\omega}_{c1},\hat{\omega}_w)$ when an odd-numbered gear stage is engaged, $T_{se}(\hat{\omega}_{c2},\hat{\omega}_w)$ when an even-numbered gear stage is engaged
- n=o or e, i=1 or 2

$$T_{so}(\hat{\omega}_{c1},\hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

- $T_{so}$: Torsional torque of driveshaft when odd-numbered gear stage is engaged
- $\hat{\omega}_{c1}$: Estimated clutch angular velocity of first clutch
- $\hat{\omega}_w$: Estimated wheel angular velocity
- $k_s$: Stiffness coefficient of driveshaft
- $b_s$: Damping coefficient of driveshaft
- $\omega_{c1}$: Measured clutch angular velocity of first clutch
- $\varphi_o$: Odd-numbered gear stage (ex, 1-gear stage, 3-gear stage, 5-gear stage . . . ) $\gamma_T(\varphi_o)$: Gear ratio at gear stage $\varphi_o$ $$T_{se}(\hat{\omega}_{c2},\hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

- $T_{se}$: Torsional torque of driveshaft when even-numbered gear stage is engaged
- $\hat{\omega}_{c2}$: Estimated clutch angular velocity of second clutch
- $\omega_{c2}$: Measured clutch angular velocity of second clutch
- $\varphi_e$: Even-numbered gear stage (ex, 2-gear stage, 4-gear stage, 6-gear stage . . . )
- $\gamma_T(\varphi_e)$: Gear ratio at gear stage $\varphi_e$
- $T_L(\hat{\omega}_w)$: Vehicle load.

9. The clutch torque estimating method of claim 4, wherein the clutch friction force characteristic model of the first clutch is $$\hat{\mu}_{c1}(\hat{\omega}_{s1},\hat{z}_{c1}) = \sigma_{c10}\hat{z}_{c1} + \sigma_{c11}\dot{\hat{z}}_{c1} + \sigma_{c12}\hat{\omega}_{s1}, \text{ where}$$

$$\hat{\omega}_{s1} = \hat{\omega}_e - \hat{\omega}_{c1}$$

$$\dot{\hat{z}}_{c1} = \hat{\omega}_{s1} - \sigma_{c10}\frac{|\hat{\omega}_{s1}|}{g(\hat{\omega}_{s1})}\hat{z}_{c1}$$

- $\hat{\mu}_{c1}$: Clutch characteristic variable of first clutch
- $\hat{\omega}_{s1}$: Estimated clutch slip of first clutch
- $\hat{\omega}_e$: Estimated engine angular velocity
- $\hat{\omega}_{c1}$: Estimated clutch angular velocity of first clutch
- $\sigma_{c10}$: Stiffness coefficient against internal friction force of first clutch
- $\sigma_{c11}$: Damping coefficient against internal friction force of first clutch
- $\sigma_{c12}$: Damping coefficient for slip of first clutch
- $z_{c1}$: Internal variable for determining friction force of first clutch
- $g(\hat{\omega}_{s1})$: Friction force according to slip of first clutch when a change of $z_{c1}$ is 0 (normal state)

$$g(\hat{\omega}_{s1}) = f_{c1c} + (f_{c1s} - f_{c1c})e^{-(\hat{\omega}_{s1}/\hat{\omega}_{cs})^2}$$

- $f_{c1c}$: Coefficient of kinetic friction of first clutch
- $f_{c1s}$: Coefficient of static friction of first clutch
- $\omega_{cs}$: Critical slip velocity (threshold velocity for discriminating static friction and kinetic friction).

10. The clutch torque estimating method of claim 4, wherein the clutch friction force characteristic model of the second clutch is $$\hat{\mu}_{c2}(\hat{\omega}_{s2}, \hat{z}_{c2}) = \sigma_{c20}\hat{z}_{c2} + \sigma_{c21}\dot{\hat{z}}_{c1} + \sigma_{c22}\hat{\omega}_{s2}, \text{ where}$$

$$\hat{\omega}_{s2} = \hat{\omega}_e - \hat{\omega}_{c2}$$

$$\dot{\hat{z}}_{c2} = \hat{\omega}_{s2} - \sigma_{c20}\frac{|\hat{\omega}_{s2}|}{g(\hat{\omega}_{s2})}\hat{z}_{c2}$$

$\hat{\mu}_{c2}$: Clutch characteristic variable of first clutch
$\hat{\omega}_{s2}$: Estimated clutch slip of first clutch
$\hat{\omega}_e$: Estimated engine angular velocity
$\hat{\omega}_{c2}$: Estimated clutch angular velocity of first clutch
$\sigma_{c20}$: Stiffness coefficient against internal friction force of first clutch
$\sigma_{c21}$: Damping coefficient against internal friction force of first clutch
$\sigma_{c22}$: Damping coefficient for slip of first clutch
$z_{c2}$: Internal variable for determining friction force of first clutch
$g(\hat{\omega}_{s2})$: Friction force according to slip of first clutch when a change of $z_{c2}$ is 0 (normal state)

$$g(\hat{\omega}_{s2}) = f_{c2c} + (f_{c2s} - f_{c2c})e^{-(\hat{\omega}_{s2}/\hat{\omega}_{cs})^2}$$

$f_{c2c}$: Coefficient of kinetic friction of first clutch
$f_{c2s}$: Coefficient of static friction of first clutch
$\omega_{cs}$: Critical slip velocity (threshold velocity for discriminating static friction and kinetic friction).

\* \* \* \* \*